No. 645,937. Patented Mar. 27, 1900.
J. J. BROOKS.
COTTON CHOPPER.
(Application filed Jan. 2, 1900.)
(No Model.) 2 Sheets—Sheet 1.
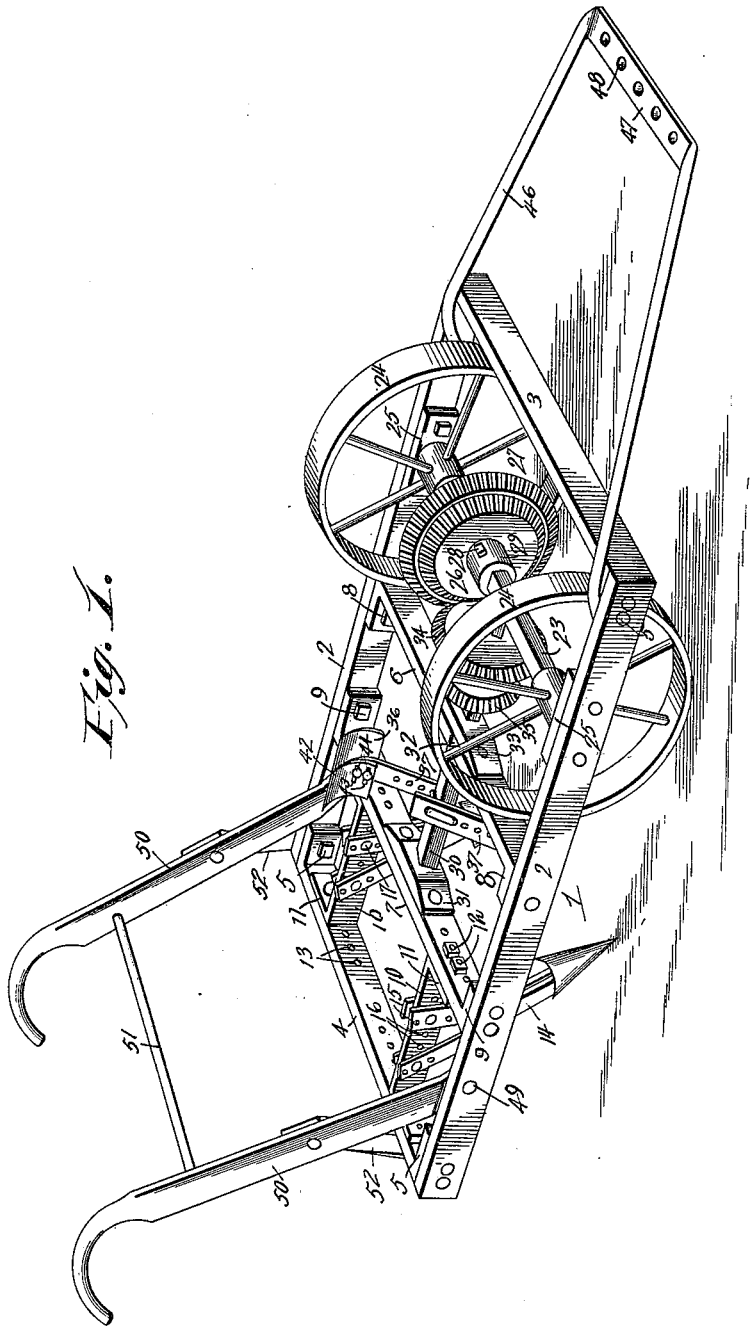

No. 645,937. Patented Mar. 27, 1900.
J. J. BROOKS.
COTTON CHOPPER.
(Application filed Jan. 2, 1900.)
(No Model.) 2 Sheets—Sheet 2.
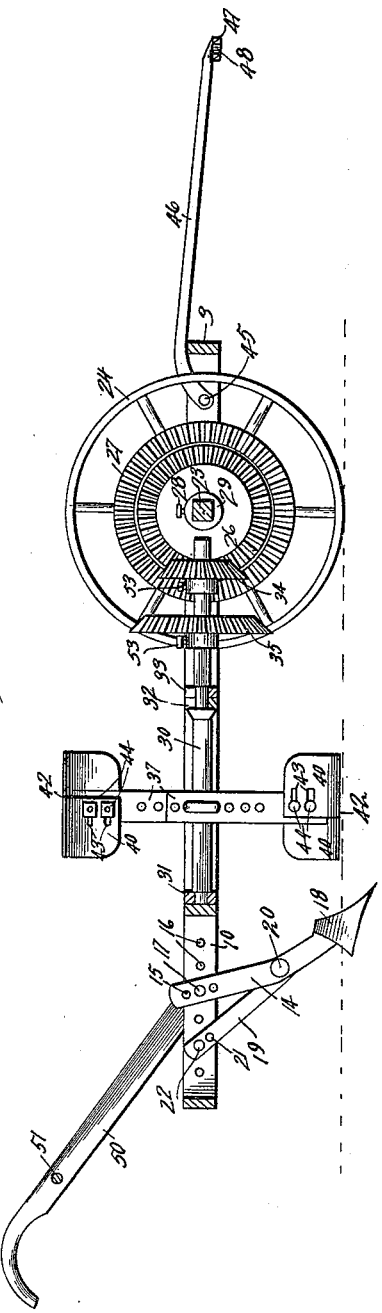
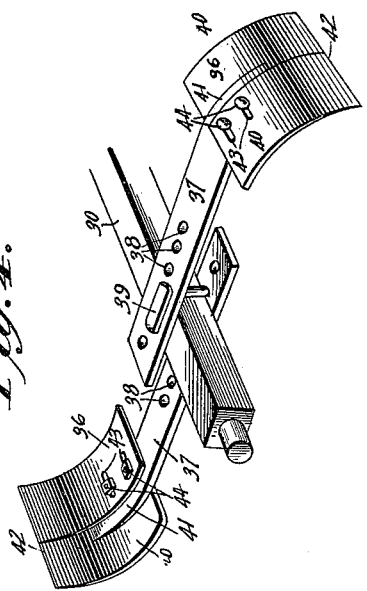
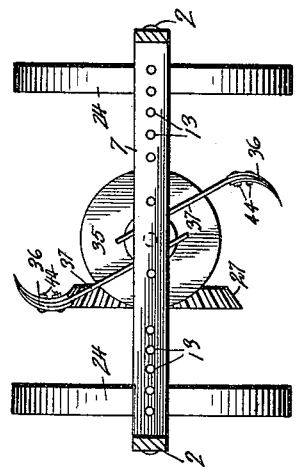
Witnesses
C. H. Walker
J. W. Garner
John J. Brooks Inventor
By his Attorneys,
C. A. Snow & Co.

UNITED STATES PATENT OFFICE.

JOHN JOSEPH BROOKS, OF GRAPELAND, TEXAS.

COTTON-CHOPPER.

SPECIFICATION forming part of Letters Patent No. 645,937, dated March 27, 1900.

Application filed January 2, 1900. Serial No. 102. (No model.)

*To all whom it may concern:*

Be it known that I, JOHN JOSEPH BROOKS, a citizen of the United States, residing at Grapeland, in the county of Houston and State of Texas, have invented a new and useful Cotton-Chopper, of which the following is a specification.

My invention is an improved cotton chopper and cultivator, the object of my invention being to provide a cotton chopper and cultivator with devices whereby the chopping-hoes can be caused to rotate at any desired rate of speed, and hence to leave "stands" of cotton-plants in the rows at any desired distance apart without altering the speed of the horse or team.

A further object of my invention is to provide a chopping-hoe for cotton-chopping machines which may be narrowed or widened to any required breadth to suit varying conditions.

A further object of my invention is to provide a cotton-chopper with radially-adjustable chopping-hoes which may be adapted to operate at any desired depth in the soil.

A further object of my invention is to provide a cotton chopping and cultivating machine in which the cultivating plows or shovels are capable of being adjusted laterally to operate at any desired width apart, vertically to operate in and stir the soil to any desired depth, and longitudinally on the machine-frame to permit them to operate abreast of each other or either in advance of the other.

A further object of my invention is to provide a cotton chopping and cultivating machine with a draft-frame adapted for the attachment of the singletree at any desired lateral adjustment.

A further object of my invention is to provide a cotton chopping and cultivating machine with laterally-extended handles to enable the plowman to walk on one side of the rows without strain or fatigue.

To these ends my invention consists in the peculiar construction and combination of devices hereinafter fully set forth, and particularly pointed out in the claims.

In the accompanying drawings, Figure 1 is a perspective view of a cotton chopper and cultivator embodying my improvements. Fig. 2 is a vertical longitudinal central sectional view of the same. Fig. 3 is a transverse sectional view of the same. Fig. 4 is a detail perspective view illustrating the construction of my improved chopping-hoes, whereby they may be varied in width and adjusted radially on their shaft.

The rectangular frame 1 of my improved cotton chopper and cultivator, which is preferably made of iron or steel, comprises the pair of side bars 2, the front and rear cross-bars 3 4, which are bolted thereto, as shown at 5, and the intermediate cross-bars 6 7, which are bolted to said side bars, as at 8 9, respectively. A pair of longitudinal plow-bars 10 are provided at their ends with right-angled extensions 11, which bear against and fit between the cross-bars 4 7 at the rear end of the frame and are secured to said cross-bars by bolts 12, which pass through appropriate openings in the series of openings 13, with which said cross-bars are provided, said series of openings 13 being made at regular intervals substantially throughout the extent of said cross-bars 4 7, and hence permitting of any desired lateral adjustment of the plow-bars in the frame, thus enabling the plows to be caused to operate at any desired distance apart and at any desired distance to either side of the cotton-rows.

The plow feet or standards 14 are bent or of the form shown in Fig. 2 and are provided at their upper ends with series of adjusting bolt-holes 15, by means of which and by series of openings 16 in the plow-bars said feet or plow-standards may be secured to said plow-bars by bolts 17, either abreast of each other or one in advance of the other and at any desired vertical adjustment, and hence enable the plows or shovels 18 to be run at any desired depth in the soil. A brace-bar 19 is pivotally connected to each of the plow-standards by a bolt 20, and said brace-bars are provided with adjusting series of bolt-holes 21, and hence said brace-bars may be secured to the plow-bars at any desired inclination by the bolts 22, which pass through appropriate openings 21 and 16, said brace-bars maintaining the plow-standards at any required inclination.

A shaft 23, provided with supporting and driving wheels 24, is mounted in suitable bearings 25, bolted to the inner side of the side bars 2, near the front end of the frame. On the said shaft are keyed a pair of laterally-adjustable beveled gear-wheels 26 27, one of which is larger than the other, and said gear-wheels are secured at any desired adjustment on said shaft by the bolts 28 in threaded openings in hubs or collars 29, formed on the sides of said wheels.

The longitudinal chopper-operating shaft 30 has its rear end supported in a bearing 31, bolted to the front side of the cross-bar 7 at the center thereof. Said chopper-operating shaft extends through an open slot or recess 32 in the upper side of the center of the cross-bar 6 and is journaled in a removable bearing 33, bolted on the front side of the cross-bar 6 at the center thereof, and on the forward extension of said chopper-operating shaft are a pair of beveled gear-wheels 34 35, each of which is provided with a clamping-bolt 53, and thereby said beveled wheels are adjustable on the chopper-operating shaft, and either of them may be caused to engage either the wheel 26 or the wheel 27, and hence to communicate motion at any desired rate of speed to the chopper-operating shaft, and hence cause the chopper to leave stands of cotton-plants in the rows at any desired distance apart without altering the speed of the horse or team.

The chopping-hoes 36 are carried by radial arms 37, having adjusting series of openings 38, by means of which openings said arms may be secured on opposite sides of the shaft 30 by a U-shaped bolt 39, with the chopping-hoes at any desired distance from said shaft 30, and hence controlling the depth at which the chopping-hoes operate in the rows.

In order to enable my improved chopping-hoes 36 to be varied in width, each of the said hoes is composed of a pair of sections 40, which bear on opposite sides of the curved portions 41 of the arms 37, said sections converging toward each other and contacting with each other at their outer operating edges 42. The sections 40 of the chopping-hoes are provided with lateral adjusting-slots 43, which receive the bolts 44, that pass through openings in the outer portions of the arms 37 and serve to clamp the sections of the chopping-hoes to said arms 37 at any desired lateral adjustment.

To the front end of the frame 1 is pivotally connected, as at 45, a draft-frame 46, having the lateral draft-bar 47, provided throughout its extent with the series of adjusting-openings 48, adapted to be engaged by the link or hook of a singletree, thereby enabling the singletree to be attached to the machine at any desired lateral adjustment, and hence counteracting any tendency to side draft.

To the rear portion of the frame 1 are bolted, as at 49, the laterally-extending plow-handles 50, which, as here shown and preferably, are disposed obliquely to the left of the machine-frame, thus enabling the plowman, who walks behind the machine and drives the horse, to walk between the rows of plants and to control the operation of the machine and direct the same in line with the rows without excessive fatigue. The handles 50 are connected together by the usual bar 51 and are braced in position by the usual brace-bars 52, which are bolted to them and to the machine-frame, as shown.

By unshipping the shaft 30, and thereby removing the chopping-hoes, my improved cotton chopper and cultivator is adapted to be used for cultivating growing plants other than cotton, which do not require to be chopped or thinned to form the stands.

It will be understood from the foregoing that my improved cotton chopper and cultivator is light, cheap, and of simple construction, not likely to get out of order, is of easy draft, easily operated by the plowman, and of maximum efficiency.

Having thus described my invention, I claim—

1. In a cotton chopper and cultivator, the combination, with the frame, of the laterally-adjustable plow-bars 10, the plow-standards vertically and longitudinally adjustable on said bars, and the brace-bars 19 pivoted to said plow-standards, and adapted to be secured to said plow-bars 10 at any desired vertical and longitudinal adjustment, and hence support the plow-standards at any desired inclination, substantially as described.

2. The combination, in a cotton chopper and cultivator, of the frame, the driving-shaft mounted therein and having the supporting-wheels and gear-wheels 26, 27, of unequal size, said gear-wheels being laterally adjustable on said shaft; the longitudinal shaft 30 journaled in bearings in said frame and carrying the chopping-hoes, and the gear-wheels 34, 35, on said shaft and adapted to be secured thereto at any desired adjustment, whereby either of said gear-wheels may be caused to engage either of the gear-wheels on the driving-shaft, to vary the speed of said shaft 30, for the purpose set forth, substantially as described.

3. In a cotton-chopper, the combination of the rectangular frame having the intermediate cross-bars 6, 7, the laterally-adjustable plow-bars 10, the plow-standard vertically and longitudinally adjustable on said bars, and having the brace-bars 19, the driving-shaft in the frame and having the supporting and gear wheels, and the longitudinal shaft 30, journaled in bearings in bars 6, 7, said shaft carrying the chopping-hoes and having a gear-wheel engaging the gear-wheel on the drive-shaft, substantially as described.

4. The chopping-hoes, comprising the slidable overlapping sections 40, and devices, substantially as set forth, to secure said sections together, and to an arm or standard, whereby said chopping-hoes may be varied in width, substantially as described.

5. The chopping-hoe, comprising the slidable overlapping sections 40, provided (one or both) with lateral slots 43 and clamping-bolts in said slots, substantially as described.

6. The combination, with the arm 37, of the chopping-hoe sections 40, overlapping each other, adapted to move laterally and disposed on opposite sides of said arm 37, and devices, substantially as described, to secure said sections 40 together and to said arm 37, at any desired lateral adjustment, whereby the width of said chopper may be varied, substantially as described.

In testimony that I claim the foregoing as my own I have hereto affixed my signature in the presence of two witnesses.

JOHN JOSEPH BROOKS.

Witnesses:
 W. T. MAYO,
 B. S. GRAY.